United States Patent Office 2,995,537
Patented Aug. 8, 1961

2,995,537
GUM PLASTIC COMPOSITION CONTAINING ROSIN
Mortimer S. Thompson, North Woodbury, Conn., assignor to United States Rubber Company, New York, N.Y., a corporation of New Jersey
No Drawing. Filed Jan. 8, 1958, Ser. No. 707,676
5 Claims. (Cl. 260—27)

This invention relates to a plastic composition, and, more particularly, it relates to a resinous composition that is especially suitable for forming shaped articles by injection molding, which articles are characterized by an unusual combination of physical properties, especially great impact strength in conjunction with rigidity and hardness.

There are known in the art certain rubber-and-resin plastic compositions, sometimes called "gum plastics," which are frequently based on mixtures of resinous plastic materials and rubbers, and which are capable of fabrication into strong, tough, shaped articles. Certain forms of rubber-and-resin materials, or gum plastics, are called "graft polymers" and are made by polymerizing certain monomers, such as resin-forming monomers, in an emulsion of a previously prepared polymer, such as a rubbery polymer. Certain such graft polymers provide many desirable characteristics.

While the available rubber-and-resin materials or gum plastics, including the graft polymers, have proven highly useful for many purposes, they have, unfortunately, suffered from at least one serious deficiency. Such deficiency resides in the fact that the usual high-impact strength, hard and tough gum plastics are typically extremely difficult to injection mold. This inability to be easily injection molded has seriously hindered more widespread use of these materials.

The basic reason that the conventional gum plastics or rubber-resin materials are difficult to injection mold is that they do not flow readily enough to fill intricate molds at temperatures low enough to avoid deterioration of the materials. It will be understood that in injection molding, the plastic material is required to become sufficiently flowable, under the influence of the heat and applied injection pressure, to flow readily through the relatively small opening or gate in the injection mold, and the material must be sufficiently fluid to fill out the entire mold cavity, which frequently consists of an intricate pattern including many relatively restricted areas. The material must knit together in the mold cavity into a strong, unitary, properly shaped body that is free from voids or any sort of discontinuities, and that reproduces faithfully the exact shape and surface characteristics of the mold cavity, even in the most remote and restricted parts thereof. In conventional gum plastics, such easy flow characteristics have apparently been essentially incompatible with great toughness, rigidity, and high impact strength, and, in general, those known materials which did lend themselves to efficient and successful injection molding operations were not as tough, and/or rigid and as impact resistant as would be desired for many applications.

Accordingly, it is a principal object of the present invention to provide an improved, rigid, high impact strength, hard, plastic composition that can readily be injection molded, and otherwise processed or shaped easily. Other important objects and advantages of the invention will be made manifest in the following detailed description.

The invention is based on the surprising discovery that by combining certain materials, specifically, a particular kind of gum plastic composition based at least in part on a graft polymer, together with rosin or certain derivatives thereof, in certain proportions, it is possible to obtain a plastic material that is well adapted to injection molding operations, but which, at the same time, most unexpectedly also has a high impact strength and is tough, strong, and hard, so that it can be fabricated into rigid articles of great utility.

The gum plastic or rubber-and-resin composition employed in the invention comprises 10 to 40 parts of an emulsion polymerized synthetic rubber which is preferably a polybutadiene synthetic rubber, but which may be a copolymer of not less than 95% of polymerized butadiene and not more than 5% of a styrene copolymerized therewith, and correspondingly 90 to 60 parts of a synthetic resin emulsion polymerizate of a mixture of 25% to 90% of a styrene and correspondingly 75% to 10% of acrylonitrile. At least about 5% of the styrene-acrylonitrile resin in the rubber-and-resin composition must have been produced by polymerizing the styrene and acrylonitrile monomers conjointly in admixture with a previously prepared latex of the synthetic rubber in order to graft polymerize an appreciable amount of the resin on the synthetic rubber particles. Up to 100% of the resin in the final composition may be so polymerized in the rubber latex. Where less than all of the resin in the rubber-resin composition is polymerized in the rubber latex, the remaining styrene-acrylonitrile resin may be mixed in latex form with the latex of the rubber on which a part of the resin has been graft polymerized, and the mixed latices coagulated. Also, where less than all of the resin in the final rubber-resin composition is polymerized in the rubber latex, the remaining styrene-acrylonitrile resin in dry form recovered from the resin latex may be mixed on a mill or in an internal mixer with the dried rubber-and-resin product recovered from the latex of the rubber on which a part of the resin has been graft polymerized. The ratio of the styrene to acrylonitrile in the emulsion for preparing the separate resin may be the same as or different from the ratio of the styrene to acrylonitrile in the mixture which is polymerized in the rubber latex, provided that they are each within the above mentioned range of 25% to 90% styrene and correspondingly 75% to 10% of acrylonitrile. The styrene employed in preparing the rubber and/or the resin is preferably unsubstituted styrene itself, that is, vinyl benzene, although equivalents thereof, such as substituted styrenes, especially methyl styrenes such as alphamethyl styrene or nuclear substituted methyl styrenes (vinyl toluenes) may replace some or all of the unsubstituted styrene.

The details of preparation of the polybutadiene or butadiene-styrene copolymer rubber latex used in making the graft polymer are conventional and well-known, and require no elaboration here. The latex may be prepared at any conventional reaction temperature, such as from 0° C. to 100° C. Similarly, the details of the preparation of the styrene-acrylonitrile resin do not per se form part of the present invention, but may simply follow conventional practice. As indicated previously, the graft polymer is prepared by emulsion polymerization in accordance with the known technique of grafting a resin onto a rubber, by emulsion polymerizing the styrene and acrylonitrile in a latex of the previously prepared polybutadiene or butadiene-styrene copolymer rubber. To make the graft polymer, there are typically added to the rubber latex additional quantities of the usual emulsion polymerizing ingredients, such as emulsifying agent, catalyst and, if desired, regulator, along with the styrene and acrylonitrile monomers. These ingredients may be all added to the rubber latex at the start of the graft polymerization, or they may be added continuously or in increments as the graft polymerization proceeds. The kind and proportions of emulsifying agent, catalyst, and regulator may follow conventional practice in emulsion polymerization, as may the reaction conditions such as temperature (e.g. 0°–100° C.), time of reaction, etc. It is believed, that a substantial proportion of the styrene-acrylonitrile resin forms as an actual part of the previously formed rubber molecules, so that the rubber and resin are, in effect, chemically united. Whatever the theory or explanation, the fact is that such a graft polymer has different properties from a physical mixture of the separately prepared rubber and resin, or from a simple interpolymer of the monomers.

The invention is based on the unexpected discovery that the rubber-resin compositions described, when compounded with 10–40 parts of rosin per 100 parts of the rubber-resin composition, surprisingly become very easy to injection mold by reason of their remarkably improved flow properties, but at the same time the resulting materials most surprisingly retain the desirable high impact strength, toughness, and to a large extent the hardness and rigidity of the rubber-and-resin materials themselves. It is desired to emphasize that these results are in direct contrast to the results obtained by blending similar quantities of rosin with other rubber-and-resin materials, including other graft polymers.

The rosin employed in the invention may be the ordinary natural rosin obtained from pine tree exudate. Such rosin is composed of about 80% or more of isomeric forms of abietic acid, or similar acids, e.g., sapinic acid, d-pimaric acid. Natural resins of various geographical origins, based mainly on such acids, may be used. I may also use rosin which has been hydrogenated, dehydrogenated, polymerized, disproportionated, or esterified, all of which kinds of rosin are well known and readily commercially available. The preferred material for use in the invention is rosin which has been hydrogenated, as exemplified by such commercially available materials as that sold under the trade name "Staybelite." Next in preference is unmodified rosin. Third in preference is the dimerized kind of rosin, such as the material sold commercially under the trade name "Dymerex." Fourth in preference is rosin which has been esterified as exemplified by such materials as the pentaerithritol ester of rosin, sold commercially under the trade name "Pentalyn A."

It is desired to emphasize that for purposes of the invention it is essential to employ at least 10 parts of the rosin or the like, in every 100 parts of the gum plastic. The preferred mixtures contain about 15 parts to 30 parts of rosin or rosin derivative, and correspondingly 85 to 70 parts of the rubber-and-resin material, although as much as 40 parts of the rosin or the like (in 100 parts of rubber-resin) may be employed if desired. Optionally, additional compounding ingredients may be included in the mixture, such as antioxidants, pigments, fillers, mold-release agents, milling aids, flow aids, or minor amounts of other rubbers or resins.

The following examples, in which all parts are expressed by weight, will serve to illustrate the practice of the invention in more detail.

EXAMPLE I

*Preparation of rubber latex*

IA. The following recipe was polymerized at a temperature of about 65° with agitation until a conversion of 70–90% was obtained:

| | Parts |
|---|---|
| Water | 180 |
| Potassium oleate | 5 |
| Potassium hydroxide | 0.25 |
| Potassium persulfate | 0.2 |
| Mixed tertiary alkyl ($C_{12}$, $C_{14}$ and $C_{16}$) mercaptans | 0.25 |
| Butadiene | 100 |

The resulting latex contained about 58% polybutadiene rubber.

IB. The foregoing preparation is repeated, using 5 parts of styrene and 95 parts of butadiene, instead of butadiene alone.

IC. Example IB is repeated, using α-methyl styrene in place of styrene itself.

EXAMPLE II

*Preparation of graft polymer*

IIA. The rubber latex of Example IA was used to prepare a graft polymer by mixing the following recipe:

| | Parts |
|---|---|
| Polybutadiene latex of Ex. IA | 80 |
| Water | 250 |
| Potassium persulfate | 0.7 |
| Sodium hydroxide | 0.15 |

The temperature of the mix was raised to 50° C. and 0.07 part of sodium bisulfate was added. There was then added continuously to the mixture over a period of six hours, with agitation, a solution of 0.2 part of sodium hydroxide and 2 parts of sodium rosin soap dissolved in water and a mixture of 30 parts of styrene and 17.5 parts of acrylonitrile. Agitation was continued at 50° C. for another four hours, at the end of which time the conversion was 85%. The resulting latex was coagulated with calcium chloride and the coagulum dried. The product contained 46 parts of resin and 54 parts of rubber.

IIB. Example IIA is repeated, using the rubbers of Example IB or IC.

IIC. Examples IIA or IIB are repeated, using α-methyl styrene in place of styrene itself.

EXAMPLE III

*Preparation of resin*

IIIA. The following recipe was agitated four hours at 50° C., giving 100% conversion:

| | Parts |
|---|---|
| Styrene | 70 |
| Acrylonitrile | 30 |
| Water | 200 |
| Emulsifying agent (e.g. alkyl aryl sulfonate such as "Nacconal NRSF") | 2 |
| Potassium persulfate | 0.3 |
| Sodium bisulfite | 0.01 |
| Mixed tertiary alkyl ($C_{12}$, $C_{14}$, $C_{16}$) mercaptans | 0.35 |

(It will be understood that the emulsifying agent is conventional and forms no part of the invention. Any suitable conventional emulsifying agent may be used.) The latex was coagulated with calcium chloride and dried.

IIIB. The foregoing is repeated, using α-methyl styrene in place of styrene itself.

EXAMPLE IV

IVA. Twelve separate mixes were prepared by blending on a hot mill a preblended mixture of the graft polymer of Example IIA, additional styrene/acrylonitrile resin of Example IIIA and pulverized hydrogenated rosin ("Staybelite"). The mill had been heated to 320° F. and the materials were fused and blended for 10 minutes. The proportions used are shown in Table I.

Test samples were prepared by injection molding into a test bar mold using a 4 ounce Reed-Prentice molding machine. Molding temperatures were 420° F. (plastic temperature was about 450° F.).

The test pieces were subjected to certain physical testing procedures, with the results shown in Table I. The following tests were conducted in accordance with standard ASTM procedure: Charpy unnotched impact strength, Izod notched impact strength, tensile strength and elongation, Rockwell hardness and heat distortion temperature.

The value designated "MFP" (minimum filling pressure) is the pressure, as read on the injection molding machine, necessary to just fill the mold under standard conditions of heat and cycle. The lower this value the better the plastic flow.

The 400° F. Mooney value is a flow evaluation test which measures the resistance to a shearing stress at molding temperatures. The equipment used is the Mooney tester widely employed in measuring the same effect in the rubber industry. The lower the value the better the flow properties are.

tics with high heat resistance. In fact, when "Staybelite" is added to those mixes having the poorest flow properties (i.e., those with the highest rubber content) the heat distortion temperature is actually improved by virtue of the fact that there is less molded-in strain because the material has better flow properties. Heat distortion tem-

TABLE I

*Effect of "Staybelite" resin on physical properties of styrene/acrylonitrile-polybutadiene graft*

| Mix No | 1 | 2 | 3 | 4 | 5 | 6 | 7 | 8 | 9 | 10 | 11 | 12 |
|---|---|---|---|---|---|---|---|---|---|---|---|---|
| Styrene/acrylonitrile (70/30) resin of Ex. III | 35 | 35 | 50 | 50 | 50 | 60 | 60 | 60 | 70 | 70 | 80 | 80 |
| Polybutadiene (54) styrene-acrylonitrile graft of Ex. II | 65 | 65 | 50 | 50 | 50 | 40 | 40 | 40 | 30 | 30 | 20 | 20 |
| Hydrogenated rosin ("Staybelite") | 0 | 20 | 0 | 20 | 40 | 0 | 20 | 40 | 0 | 20 | 0 | 20 |
| 400° F. Mooney | 55 | 33 | 50 | 22 | 13 | 39 | 20 | 12 | 35 | | 28 | |
| Flow (MFP), p.s.i. | 860 | 470 | 800 | 470 | 280 | 770 | 430 | 270 | 600 | 350 | 500 | 340 |
| Izod notched impact (room temperature), ft. lbs. per inch of notch | 8.7 | 9.0 | 9.8 | 9.7 | 7.8 | 8.2 | 8.2 | 6.8 | 4.7 | 5.9 | 2.6 | 2.6 |
| Tensile strength, p.s.i. | 4,200 | 3,250 | 5,300 | 4,630 | 3,580 | 6,150 | 5,150 | 4,000 | 7,060 | 6,250 | 8,300 | 7,200 |
| Elongation, percent | 85 | 110 | 63 | 108 | 125 | 60 | 40 | 98 | 10 | 18 | 13 | 10 |
| Rockwell Hardness, "R" scale | 81 | 52 | 91 | 71 | 58 | 99 | 89 | 65 | 108 | 99 | 112 | 105 |
| Heat Distortion temperature, °C | 69 | 74 | 81 | 76 | 65 | 91 | 84 | 80 | 98 | 75 | 88 | 80 |

As will be observed from Table I, mixes 1, 3, 6, 9 and 11 contained no hydrogenated rosin, and do not represent the invention. Mixes 2, 4, 5, 7, 8, 10 and 12, all of which contained either 20 or 40 parts of hydrogenated rosin per 100 parts of plastic, represent the practice of the invention. It will be observed that in all cases the mixes containing no hydrogenated rosin had an excessively high minimum filling pressure ("MFP" as defined above), indicating that they would be totally unsatisfactory for intricate injection molding operations, since the material would not fill the mold properly. In all cases the mixtures containing no hydrogenated rosin had minimum filling pressures of 500 p.s.i. or over, which is unsatisfactory. The worst mixes in this respect were those containing the highest proportion of graft polymer. On the other hand, the mixes of the invention, containing the hydrogenated rosin, will be seen to have in all cases appreciably lower minimum filling pressures than the conventional mixes. The mixes of the invention had minimum filling pressures of 470 pounds or less. This indicates that these mixes would be perfectly satisfactory for high speed injection molding operations, since the material would flow readily into the mold, and would fill out the mold properly and knit together well. At the same time, it will be apparent from Table I that the mixes of the invention retained the desirable high impact strength. The uniqueness of the invention lies in this fact. Thus, it will be noted that Izod notched impact strengths have been maintained over the whole range of rubber content variation.

The plastic compositions of the invention are particularly useful in injection molding of intricate parts. The mixes without "Staybelite" would require much higher temperatures in order to fill an intricate injection mold properly. This excessive heat would thermally degrade the plastic, with the result that it would not retain those properties associated with good toughness. In contrast the "Staybelite"—containing mixes of the invention would not require such drastically elevated temperatures to obtain the fluidity necessary to fill intricate molds, and therefore these compositions would substantially retain their inherent toughness.

It will also be observed from Table I that the tensile strength of the mixes of the invention remains at a high and useful level. The elongation (which is also an indication of toughness) of the mixes of the invention is generally as high or higher than the control mixes (with the possible exception of marginal discrepancies arising from the inherent difficulty in reproducing results consistently in this test). It will also be noted that the hardness and heat distortion temperature of the mixes of the invention are well within the limits demanded of rigid plastics with high heat resistance. In fact, when "Staybelite" peration is quite an erratic property to measure, but a large number of tests have confirmed the foregoing.

IVB. Example IVA is repeated, using the grafts of Examples IIB or IIC, and/or the resins of Example IIIB, in place of, respectively, the graft of Example IIA and the resin of Example IIIA, with similar results.

EXAMPLE V

Example IV was repeated, except that in place of hydrogenated rosin, two other rosin derivatives were employed, in separate mixes (14 and 15), the mix designated 13 being a control containing no rosin or rosin derivative. The results are summarized in Table II. Table II shows that high levels of impact-resistance have been retained with these modifiers. Even greater retention of hardness and heat-resistance properties was accomplished compared with compositions modified with "Staybelite."

TABLE II

*Effect of rosin derivatives on physical properties of styrene-acrylonitrile/polybutadiene grafts*

| Mix No | 13 | 14 | 15 |
|---|---|---|---|
| Resin of Ex. IIIA | 35 | 35 | 35 |
| Graft of Ex. IIA | 65 | 65 | 65 |
| Dimerized rosin ("Dymerex") | | 30 | |
| Pentaerythritol ester of rosin ("Pentalyn A") | | | 30 |
| 400° F. Mooney | 55 | 23 | 25 |
| Flow (MFP), p.s.i. | 860 | 440 | 460 |
| Izod notched impact, ft. lbs. per inch of notch | 8.7 | 7.3 | 5.8 |
| Tensile strength, p.s.i. | 4,200 | 3,800 | 3,775 |
| Elongation, percent | 85 | 35 | 40 |
| Rockwell hardness, "R" scale | 81 | 74 | 67 |
| Heat distortion temperature, °C | 69 | 70 | 70 |

EXAMPLE VI

Tables III and IV emphasize the criticality of the selection of the components in this invention, since these tables show that with other rubber-and-resin mixtures, containing no graft polymer, the results obtainable by the composition of the invention are not enjoyed. In Tables III and IV, there are shown mixes of styrene/acrylonitrile resin with butadiene/acrylonitrile rubber, with various rosin derivatives (mixes 17, 18 and 19), the mix 16 containing no rosin derivative being a control. In Table IV mixes 20 through 24 show the effect of even small amounts of added rosin derivatives.

Table III shows that the addition of rosin derivatives to this resin/rubber blend reduces the impact strength to a very low level compared to the effect of rosin derivatives on the acrylonitrile-styrene-butadiene graft system. Table IV shows that even small amounts of rosin-derivative is deleterious to impact properties in such gum-plastic mixture.

TABLE III

*Effect of various resins on physical properties of styrene-acrylonitrile/butadiene-acrylonitrile blends*

| Mix No. | 16 | 17 | 18 | 19 |
|---|---|---|---|---|
| 70/30-styrene/acrylonitrile resin | 75 | 75 | 75 | 75 |
| 70/30-butadiene/acrylonitrile rubber | 25 | 25 | 25 | 25 |
| Dymerex [1] | | 25 | | |
| Pentalyn A [2] | | | 25 | |
| Staybelite A [3] | | | | 25 |
| 400° F. Mooney | 29 | 8 | 7 | 10 |
| Flow (MFP), p.s.i. | 570 | 280 | 180 | 230 |
| Izod notched impact, ft. lbs. per inch of notch | 6.0 | 1.0 | .9 | 1.4 |
| Tensile strength, p.s.i. | 5,850 | 5,480 | 4,580 | 5,010 |
| Elongation, percent | 23 | 0 | 0 | 18 |
| Rockwell hardness, "R" scale | 102 | 102 | 92 | 94 |
| Heat distortion temperature, °C | 76 | 74 | 67 | 69 |

[1] Dymerex is the dimer of rosin.
[2] Pentalyn A is the pentaerythritol ester of rosin.
[3] Staybelite is a hydrogenated rosin.

TABLE IV

*Effect of varying percents of Staybelite on physical properties of styrene-acrylonitrile/butadiene-acrylonitrile blends*

| Mix No. | 20 | 21 | 22 | 23 | 24 |
|---|---|---|---|---|---|
| 70/30-styrene/acrylonitrile resin | 75 | 75 | 75 | 75 | 75 |
| 70/30-butadiene/acrylonitrile rubber | 25 | 25 | 25 | 25 | 25 |
| Staybelite [1] | 0 | 5 | 10 | 15 | 20 |
| Flow (MFP), p.s.i. | 560 | 490 | 430 | 350 | 290 |
| Izod notched impact, ft. lbs. per inch of notch | 6.7 | 3.6 | 2.6 | 2.1 | 1.3 |
| Tensile strength, p.s.i. | 6,210 | 6,180 | 6,000 | 5,720 | 5,750 |
| Elongation, percent | 23 | 30 | 25 | 18 | 23 |
| Rockwell hardness, "R" scale | 101 | 96 | 95 | 93 | 95 |
| Heat distortion temperature, °C | 82 | 80 | 76 | 74 | 74 |

[1] Staybelite is a hydrogenated rosin.

EXAMPLE VII

Examples IVA and IVB are repeated, using (in place of the hydrogenated rosin) rosin, dehydrogenated rosin, polymerized rosin, and disproportionated rosin, with generally similar results.

EXAMPLE VIII

The resinous copolymer of Example IIIB (alpha-methyl styrene/acrylonitrile, 70/30) is mixed with the graft polymer of Example II (styrene/acrylonitrile on polybutadiene, 50:50) in the proportions shown in Table V, below. One mix prepared in accordance with the invention contained 20 parts of rosin which had been hydrogenated ("Staybelite") while a control mix contained no rosin. The comparative properties of such mixes are shown in Table V.

TABLE V

| Mix No. | A | B |
|---|---|---|
| Resin of Example IIIB (containing alpha-methyl styrene) | 60 | 60 |
| Graft polymer of Example II | 40 | 40 |
| Hydrogenated rosin | | 20 |
| Flow (MFP) | [1] 920 | [2] 630 |
| Izod notched impact strength at room temperature (ft. lbs./inch of notch) | 6.0 | 7.2 |
| Hardness, Rockwell, "R" scale | 106 | 99 |
| Tensile strength (p.s.i.) | 7,100 | 6,100 |
| Elongation (percent) | 58 | 33 |
| Flexural strength (p.s.i.) | 10,950 | 9,100 |
| Flexural modulus (p.s.i.) | 3.8 | 2.9 |
| Heat distortion temperature (°C.) | 100 | 90 |
| Heat distortion annealed (°C.) | 101 | 98 |

[1] Cylinder temperature 470° F.; mold temp. 80° C.
[2] Cylinder temperature 450° F.; mold temp. 60° C. If this sample were run under the same conditions as Mix A, its MFP would be about 530 p.s.i.

The unexpectedness of the effect of rosin or its derivatives on the presently employed graft polymer gum plastic is emphasized by the fact that in other graft polymer gum plastic mixtures the addition of rosin or rosin derivatives result in loss of impact strength. It is also desired to emphasize that the results achieved by the present invention are not attainable by replacing rosin or its derivatives by softening or plasticizing materials, since the latter, if employed in sufficient quantities to improve the injection molding properties appreciably, destroy the tough, rigid, high-impact properties of the present graft polymer gum plastic. In brief, there appears to be a peculiar and unique cooperation between the rosin and the present rubber-and-resin material, that is not achieved with other rubber-and-resin materials.

The preferred rigid graft polymer gum plastics of the invention, when modified with a rosin as described, have minimum flow pressures less than 500 p.s.i. for the extremely tough mixes and less than 400 p.s.i. for the moderately tough mixes. Preferred materials are characterized by an impact strength of at least 2 foot pounds, and more preferably 4 foot pounds. The preferred compositions of the invention have a Rockwell R hardness of 50 or more.

Having thus described my invention, what I claim and desire to protect by Letters Patent is:

1. A composition characterized by improved injection molding properties and an impact strength of at least 4 foot-pounds, the said composition being tough and rigid and having a Rockwell hardness on the R scale of at least 50, comprising 10 to 40 parts of rosin and correspondingly 90 to 60 parts of a rubber-and-resin material comprising 10 to 40 parts of an emulsion polymerized synthetic rubber containing not less than 95% of polymerized butadiene and not more than 5% of styrene copolymerized therewith and correspondingly 90 to 60 parts of a synthetic resin aqueous emulsion copolymerizate of a mixture of 25% to 90% of styrene and correspondingly 75% to 10% of acrylonitrile, at least 5% of the styrene-acrylonitrile resin in the rubber-and-resin composition having been polymerized in admixture with the latex of said synthetic rubber containing not less than 95% of polymerized butadiene and not more than 5% of styrene copolymerized therewith, the said composition having a minimum flow pressure of less than 500 p.s.i.

2. A composition as in claim 1, in which the said synthetic rubber is polybutadiene.

3. A composition as in claim 1, containing 15 to 30 parts of the said rosin and correspondingly 85 to 70 parts of the said rubber-and-resin material.

4. A composition as in claim 1 in which the said rosin is hydrogenated.

5. A composition characterized by improved injection molding properties and an impact strength of at least 2.0 foot-pounds, the said composition being tough and rigid and having a Rockwell hardness on the R scale of at least 50, comprising from 10 to 40 parts by weight of rosin and correspondingly from 90 to 60 parts of a rubber-and-resin material comprising 10 to 40 parts by weight of an emulsion polymerized synthetic rubber containing not less than 95% of polymerized butadiene and not more than 5% of styrene copolymerized therewith and correspondingly 90 to 60 parts of a synthetic resin aqueous emulsion copolymerizate of a mixture of 25% to 90% of alpha-methyl styrene and correspondingly 75% to 10% of acrylonitrile, at least 10% of the alpha-methyl styrene-acrylonitrile resin in the rubber-and-resin composition having been polymerized in admixture with the latex of said synthetic rubber containing not less than 95% of polymerized butadiene and not more than 5% of styrene copolymerized therewith, the said composition having a minimum flow pressure of less than 500 p.s.i.

(References on following page)

References Cited in the file of this patent

UNITED STATES PATENTS

| | | |
|---|---|---|
| 2,512,697 | Te Grotenhuis | July 27, 1950 |
| 2,767,152 | Bierman et al. | Oct. 16, 1956 |
| 2,802,808 | Hayes | Aug. 13, 1957 |

OTHER REFERENCES

Amberg: Hydrogenated Rosin in Cold Rubber Tire Tread Stocks, pp. 191–9, Rubber Age, May 1951.

Howland et al.: Ind. and Eng. Chem., vol. 45, No. 5, pp. 1053–1059, May 1953.